April 26, 1949.  L. E. WOOD  2,468,698
INSTRUMENT PROTECTIVE APPARATUS
Filed Oct. 24, 1946
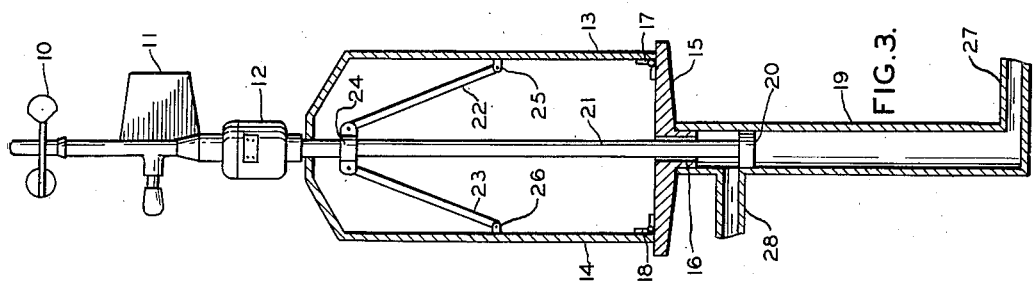
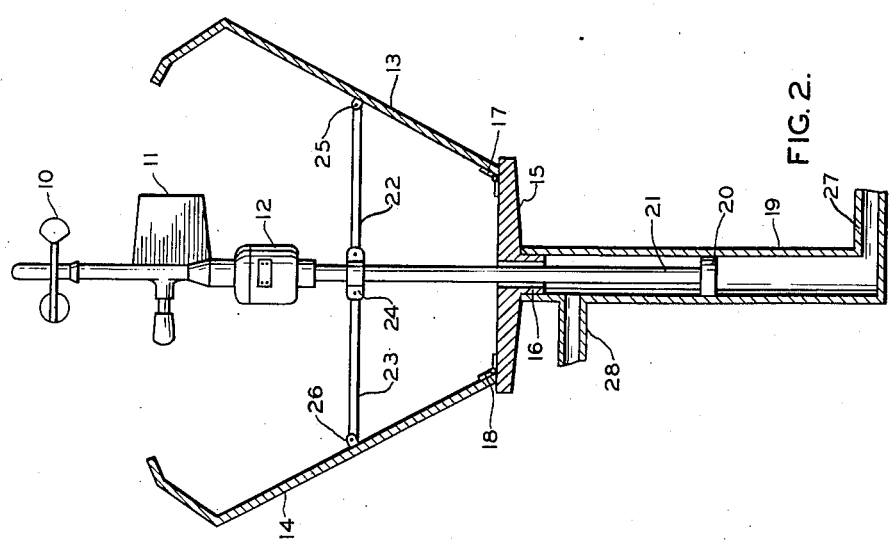
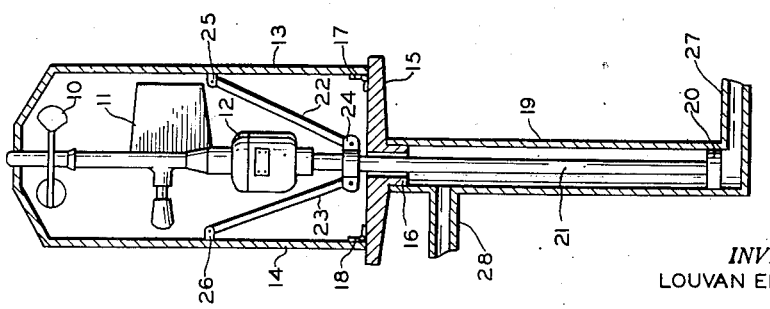
INVENTOR.
LOUVAN ELBERT WOOD
BY
William D. Hall
Attorney Patented Apr. 26, 1949

2,468,698

UNITED STATES PATENT OFFICE 2,468,698

INSTRUMENT PROTECTIVE APPARATUS

Louvan Elbert Wood, Baltimore, Md.

Application October 24, 1946, Serial No. 705,414

4 Claims. (Cl. 73—432)

The invention described herein may be manufactured and used by or for the Government for govermental purposes, without the payment to me of any royalty thereon.

The present invention relates to a weatherproof, instrument housing structure incorporating means for elevating the instrument above the housing or retracting the instrument therein, and it is more particularly directed to a retractable instrument arrangement which may be remotely and automatically controlled.

Where certain instruments are employed at weather-exposed positions, the need exists for weatherproof housings to protect the instruments when not in use, and so arranged as to enable elevation of the instruments above their housing when use thereof is desired. For example, in automatic weather stations wherein a mechanism is adapted for the automatic radio transmissions of weather observations according to a predetermined time schedule, meteorological instruments are employed at weather-exposed sites. Automatic weather stations are ordinarily used in remote regions and frequently in the North where extreme icing conditions are likely to occur. While the station actually functions only for brief periods in the course of the day, the meteorological instruments are in continuous operation and in constant exposure to the elements. Consequently, the operation of the instruments may be impaired or fully disabled due to the formation of ice thereon or other detrimental effects of the weather. Inasmuch as such weather stations are entirely automatic, operating without any attention for several months at a time, the influence of weather on the accuracy and operation of the meteorological instruments may considerably reduce the usefulness of the station and entail more frequent service attention.

In view of the foregoing disadvantages of exposed instruments, it is a primary object of the present invention to afford a protective housing for a weather-exposed instrument and means for automatically elevating the instrument above the housing or retracting the instrument therein. An important advantage of the invention arises where an instrument having moving parts, such as an anemometer, is operative only when exposed to wind. By enclosing the instrument when not in use, wear of the parts resulting from continuous movement is thereby minimized.

More specifically, an object of the invention is to provide a protective housing structure for encasing a weather-exposed instrument and hydraulic means which may be remotely controlled for elevating the instrument above the housing or retracting the instrument therein, as desired.

A feature of the invention resides in the fact that when the instrument is raised to the elevated position, the protective housing is completely enclosed so that moisture is not permitted to enter the housing during the operative period of the instrument.

Briefly stated, the invention as disclosed in one preferred embodiment comprises a slidable shaft extending into an instrument housing which is defined by a plurality of contiguous shell segments, and means cooperating with said shaft for alternately spreading apart and drawing together said segments in the course of an upward or downward movement. The instrument to be protected is mounted within the housing on the upper end of the shaft. The arrangement is such that as the shaft is displaced in an upward direction in order to elevate the instrument above the housing, the shell segments are spread apart to permit passage of the instrument and then brought together, whereby the segments are again contiguous at the point of full elevation. Similarly, in order to retract the instrument, a downward movement of the shaft first causes the segments to part, permitting lowering of the instrument and then to close about the instrument, whereby the segments are contiguous at the point of full retraction. Movement of the shaft may be accomplished by hydraulic or electrical means, thereby enabling automatic and remote control of the device.

For a better understanding of the invention as well as other objects and further features thereof, reference is had to the following detailed description to be read in connection with the accompanying drawing wherein like components are designated by like numerals. The scope of the invention will be pointed out in the annexed claims.

In the drawing:

Figure 1 is a longitudinal section taken through a preferred embodiment of an instrument protective housing in accordance with the invention, the instrument being shown in this figure in the fully retracted position within the housing;

Figure 2 shows the same embodiment as it appears at a point intermediate the retracted and the extended positions;

Figure 3 shows the same embodiment as it appears in the fully extended position.

Referring now to Figs. 1, 2 and 3, the invention is herein illustrated as employed in conjunction with a wind-measuring instrument comprising a cup anemometer 10 for indicating wind velocity, a wind vane 11 for indicating wind direction, and a transmitter 12 coupled both to the anemometer and the wind vane for emitting signals in accordance with these indications. It is to be understood that while the operation of the invention is demonstrated in connection with a wind-measuring instrument, it is not in any way limited to this application, but may be adapted to any instrument it is desired to protect.

The housing structure comprises a generally cylindrical shell which is split lengthwise to form half-segments designated by numerals 13 and 14. The shell is supported on a circular base plate 15, having a centrally disposed cylindrical knob 16 integral with the undersurface, and an axial bore therethrough. Each half-segment 13 and 14 is pivoted on plate 15 by hinges 17 and 18 attached at diametrically opposed points on the plate. The knob 16 is received in the upper end of a vertically disposed hydraulic cylinder 19, and is sealed thereto. Slidably fitting into cylinder 19 is a piston 20 which is coupled to transmitter 12 by shaft 21 coaxial with cylinder 19 and extending through the bore in plate 15.

Connecting segments 13 and 14 to shaft 21 are a pair of arms 22 and 23. A collar 24 is affixed to shaft 21 at a point adjacent to transmitter 12, the collar being provided with a pair of oppositely disposed pivot plates for pivoting respective ends of arms 22 and 23. The other ends of arms 22 and 23 are pivoted by suitable pivot plates 25 and 26 mounted on the inner surface of sections 13 and 14, respectively, at about the longitudinal midpoint.

Communicating with hydraulic cylinder 19 are pipes 27 and 28, pipe 27 feeding laterally into the lower end of the cylinder and pipe 28 feeding laterally into the upper end. Movement of piston 20 is limited between pipes 27 and 28. It will be seen that hydraulic pressure applied through pipe 27 effects upward movement of shaft 21, while pressure applied through pipe 28 effects downward movement. Arms 22 and 23, which cooperate with shaft 21, serve to alternately separate and reassemble hinged segments 13 and 14 in the course of a full upward or downward movement of shaft 21.

In operation, as shaft 21 moves in an upward direction to elevate the instrument, arms 22 and 23, which initially are extended above collar 24, are extended outwardly causing segments 13 and 14 to spread apart, maximum separation being attained at the point where arms 22 and 23 are perpendicular to shaft 21. This is the condition shown in Fig. 2. As the upward movement continues the instrument is elevated above the housing, while the segments 13 and 14 are drawn together by arms 22 and 23 as they fall below collar 24 until they are contiguous at the point of maximum elevation. This is the condition shown in Fig. 3.

In a similar manner, as shaft 21 moves downwardly to retract the instrument, arms 22 and 23 cause pivoted segments 13 and 14 to part, and as the movement continues segments 13 and 14 are again brought together about the instrument until they are contiguous at the point of maximum retraction.

It is desirable that the hydraulic pressure applied to piston 20 be sufficient to crack any ice which may form on the outer surface of the shell to seal together segments 13 and 14. Where the instrument operates in extreme cold, infra-red ray heat lamps (not shown) may be installed on plate 15 within the housing to obviate the formation of ice and the freezing of instrument lubricants. Such lamps are also useful in damp climates to reduce corrosion of parts.

In actual practice, where the invention is used in connection with an automatic weather station, the hydraulic system is associated with the transmission timing mechanisms whereby the instrument is automatically elevated for operation during the transmission periods and retracted during the silent periods. While the instrument has been illustrated in an embodiment incorporating a hydraulic system to motivate shaft 21, it is to be understood that other power means, such as an electrical motor, may be used in lieu of the hydraulic system, and suitable control means for the power system may be associated with the transmission timing mechanism in an automatic weather station.

While there has been shown what is at present considered a preferred embodiment of the invention, it will be apparent that many changes and modifications may be made therein without departing from the invention. For example, a greater plurality of shell segments may be employed in order to permit greater separation of the segments to enable passage of a larger instrument. Therefore, it is aimed in the annexed claims to cover all such changes and modifications as fall within the true spirit and scope of the invention.

What is claimed is:

1. A device of the character described comprising a plurality of complementary shell segments defining an enclosure, hinge means for each of said segments, a slidable shaft extensible through said enclosure, an instrument mounted on one end of said shaft, means for imparting movement to said shaft, a plurality of arms each pivotally connecting said shaft to a respective one of said segments in a manner whereby said segments are alternately separated and brought together in the course of a full movement of said shaft in either direction to enable extension of the instrument outside said enclosure or retraction therein.

2. A device of the character described comprising a plurality of complementary shell segments defining an enclosure, hinge means for each of said segments, a slidable shaft extensible through said enclosure, an instrument mounted on one end of said shaft, a hydraulic cylinder having a piston therein, means coupling said piston to said shaft to impart movement to said shaft, a plurality of arms each pivotally connecting said shaft to a respective one of said segments in a manner whereby said segments are alternately separated and brought together in the course of a full movement in either direction to enable extension of the instrument outside said enclosure or retraction therein.

3. A device of the character described comprising a plurality of complementary shell segments defining an enclosure, means for pivotally supporting one end of each of said segments, a slidable shaft extensible through said enclosure and said supporting means, an instrument mounted on one end of said shaft, means for imparting movement to said shaft, and means responsive to the movement of said shaft for alternately separating and bringing together the free ends of said segments in the course of a full movement of said shaft in either direction, whereby the instrument may be extended outside said enclosure or retracted therein.

4. A device of the character described comprising a plurality of complementary shell segments defining an enclosure, means for displacing at least one of said segments to effect an opening in said enclosure, a slidable shaft extensible through said enclosure, an instrument mounted on one end of said shaft, means for imparting movement to said shaft, and means responsive to the movement of said shaft for operating said displacing means to alternately separate and bring together said segments in the course of a full movement of said shaft in either direction, whereby the instrument may be extended outside said enclosure or retracted therein.

LOUVAN ELBERT WOOD.

REFERENCES CITED

The following references are of record in the file of this patent:

UNITED STATES PATENTS

| Number | Name | Date |
|---|---|---|
| 2,011,415 | Perkins | Aug. 13, 1935 |
| 2,408,132 | Weeks | Sept. 24, 1946 |